(12) United States Patent
Rao et al.

(10) Patent No.: US 9,479,982 B2
(45) Date of Patent: *Oct. 25, 2016

(54) USER CONTEXT AWARE THROTTLING OF TRANSITION ATTEMPTS TO CONNECTED MODE

(71) Applicant: Apple Inc., Cupertino, CA (US)

(72) Inventors: Bharath Narasimha Rao, Sunnyvale, CA (US); Sree Ram Kodali, Sunnyvale, CA (US); Srinivas Pasupuleti, San Jose, CA (US); Sachin Sane, Santa Clara, CA (US); Aravind Radhakrishnan, Campbell, CA (US); Naveen Rawat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,976

(22) Filed: Nov. 3, 2015

(65) Prior Publication Data

US 2016/0057667 A1    Feb. 25, 2016

Related U.S. Application Data

(63) Continuation of application No. 14/289,002, filed on May 28, 2014, now Pat. No. 9,210,627.

(51) Int. Cl.
*H04W 36/00* (2009.01)
*H04W 74/08* (2009.01)
(Continued)

(52) U.S. Cl.
CPC ......... *H04W 36/0083* (2013.01); *H04W 28/08* (2013.01); *H04W 36/32* (2013.01); *H04W 74/0833* (2013.01); *H04W 76/027* (2013.01)

(58) Field of Classification Search
CPC ........... H04W 76/048; H04W 52/028; H04W 48/02; H04W 76/02; H04W 36/0022; H04W 48/16; H04W 52/0229; H04W 52/0245; H04W 52/0216; H04W 52/12; H04W 52/146; H04W 52/243; H04W 52/287; H04W 36/0083; H04W 36/32; H04W 28/08; H04W 74/0833; G11B 2020/1074; G05B 13/042; H02M 2001/0032; H02M 3/1584; G06F 1/3203; G06F 1/3231; H04B 10/07955; H04L 12/12

See application file for complete search history.

(56) References Cited

U.S. PATENT DOCUMENTS 6,304,754 B1 * 10/2001 DeSantis ............... H04W 16/18
455/429
8,428,637 B2 * 4/2013 Narang ................. H04W 48/16
455/127.1

(Continued)

FOREIGN PATENT DOCUMENTS

WO    2013025142 A1    2/2013

OTHER PUBLICATIONS

Ericsson, "TSG-RAN Working Group 2 (Radio layer 2 and Radio layer 3)", Sophie Antipolis, Aug. 16-20, 1999, TSGR2#6(99)807—RRC Protocol status.

(Continued)

*Primary Examiner* — Nizar Sivji
(74) *Attorney, Agent, or Firm* — Meyertons Hood Kivlin Kowert & Goetzel, P.C.; Jeffrey C. Hood; Joel L. Stevens (57) ABSTRACT

Throttling of transition attempts to connected mode based on user context. A wireless device may camp on a serving cell. A motion state of the wireless device may be monitored. One or more connected mode transition procedures on the serving cell may be attempted. If at least a threshold number of connected mode transition procedures fail on the serving cell while the wireless device is stationary, further connected mode transition attempts may be throttled for up to a certain amount of time. Alternatively, or in addition, the wireless device may bar itself from camping on that cell for up to a certain amount of time. Either or both of throttling connected mode transition attempts or barring cells may also be based on other aspects of user context, such as display state.

20 Claims, 4 Drawing Sheets

(51) Int. Cl.
*H04W 28/08* (2009.01)
*H04W 36/32* (2009.01)
*H04W 76/02* (2009.01)

(56) References Cited

U.S. PATENT DOCUMENTS

| | | | |
|---|---|---|---|
| 2006/0189318 A1* | 8/2006 | Kang | H04W 52/287 455/436 |
| 2007/0142051 A1* | 6/2007 | Xu | H04W 36/12 455/436 |
| 2008/0102835 A1* | 5/2008 | Zhao | H04W 36/32 455/436 |
| 2008/0207249 A1* | 8/2008 | Choi | H04W 52/12 455/522 |
| 2008/0214249 A1* | 9/2008 | Kim | H04B 1/1615 455/574 |
| 2009/0137247 A1* | 5/2009 | Mok | H04W 48/16 455/434 |
| 2009/0180414 A1 | 7/2009 | Maeda et al. | |
| 2013/0094364 A1 | 4/2013 | Bjorkengren et al. | |
| 2013/0107778 A1 | 5/2013 | Ryu et al. | |
| 2013/0210420 A1* | 8/2013 | Deivasigamani | H04W 52/0245 455/423 |
| 2014/0050170 A1 | 2/2014 | Xu et al. | |
| 2014/0344599 A1 | 11/2014 | Branover et al. | |
| 2015/0105062 A1 | 4/2015 | Quan et al. | |

OTHER PUBLICATIONS

LTE Sec 23.1, "RRC connection establishment", http://lte-bullets.com/LTE%20in%20Bullets%20-%20RRC%20Establishment.pdf, 4 pages. [accessed Nov. 13, 2015].

* cited by examiner

USER CONTEXT AWARE THROTTLING OF TRANSITION ATTEMPTS TO CONNECTED MODE

PRIORITY CLAIM

The present application is a continuation of U.S. application Ser. No. 14/289,002 titled "User Context Aware Throttling of Transition Attempts to Connected Mode", filed on May 28, 2014, which is hereby incorporated by reference in its entirety as though fully and completely set forth herein.

FIELD

The present application relates to wireless devices, and more particularly to a system and method for a wireless device to enable and disable connected mode transition attempt throttling based at least in part on device motion.

DESCRIPTION OF THE RELATED ART

Wireless communication systems are rapidly growing in usage. Further, wireless communication technology has evolved from voice-only communications to also include the transmission of data, such as Internet and multimedia content. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Many wireless communication technologies, such as cellular communication technologies, provide mobile communication capabilities to wireless devices, such as cellular phones. For example, cellular communication services may be provided by deploying a network of cells on various radio frequencies and at various locations, such that a wireless device may select and attach to a serving cell, with the capability to re-select to a new serving cell. Such a wireless device may be able to camp on its serving cell in an idle mode, or transition (for example using a random access channel (RACH) procedure) to a connected mode in which network data exchange may occur.

SUMMARY

Embodiments are presented herein of methods for wireless devices to enable and disable connected mode transition attempt throttling based at least in part on device motion, and of devices configured to implement the methods.

According to the techniques described herein, a wireless device which is stationary and experiencing difficulty transitioning to connected mode with its serving cell may enable throttling of any further such transition (e.g., RACH) attempts, or alternatively bar camping on that serving cell, for up to a certain period of time.

In some instances, such throttling may be enabled only under certain conditions. For example, a wireless device may not enable such throttling (or bar the serving cell) if user activity indicators (such as device display status) are in a state indicative of high user activity (e.g., on). As another example, if the wireless device has selected or re-selected to its current serving cell relatively recently (e.g., and has not yet met a threshold number of failures to move to connected mode on the current serving cell), wireless device may not (yet) enable such throttling (or bar the serving cell).

After enabling throttling of transition attempts to connected mode (or the serving cell is barred), various conditions may trigger disabling of the such throttling (or unbarring of the serving cell). For example, if the prescribed period of time expires, such throttling may be again disabled (or the serving cell unbarred). Likewise, if user activity increases, the device is no longer stationary, the signal strength and/or quality of the serving cell changes (e.g., improves) by a significant amount (e.g., by at least a threshold amount), or the wireless device re-selects to a new serving cell, such throttling may be disabled, even before the prescribed period of time expires.

The techniques described herein may be implemented in and/or used with a number of different types of devices, including but not limited to cellular phones, tablet computers, wearable computing devices, portable media players, cellular network infrastructure equipment, servers, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure:
UE: User Equipment
BS: Base Station
RAT: Radio Access Technology
3GPP: Third Generation Partnership Project
3GPP2: Third Generation Partnership Project 2

GSM: Global System for Mobile Communication
UMTS: Universal Mobile Telecommunication System
LTE: Long Term Evolution
RACH: Random Access Procedure
RNTI: Radio Network Temporary Identifier
RA-RNTI: Random Acces RNTI
C-RNTI: Cell RNTI
TC-RNTI: Temporary Cell RNTI
TMSI: Temporary Mobile Subscriber Identity
S-TMSI: System Architecture Evolution TMSI Terms The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Cell—The term "cell" as used herein may refer to an area in which wireless communication services are provided on a radio frequency by a cell site or base station. A cell may be identified in various instances by the frequency on which the cell is deployed, by a network (e.g., PLMN) to which the cell belongs, and/or a cell identifier (cell id), among various possibilities.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
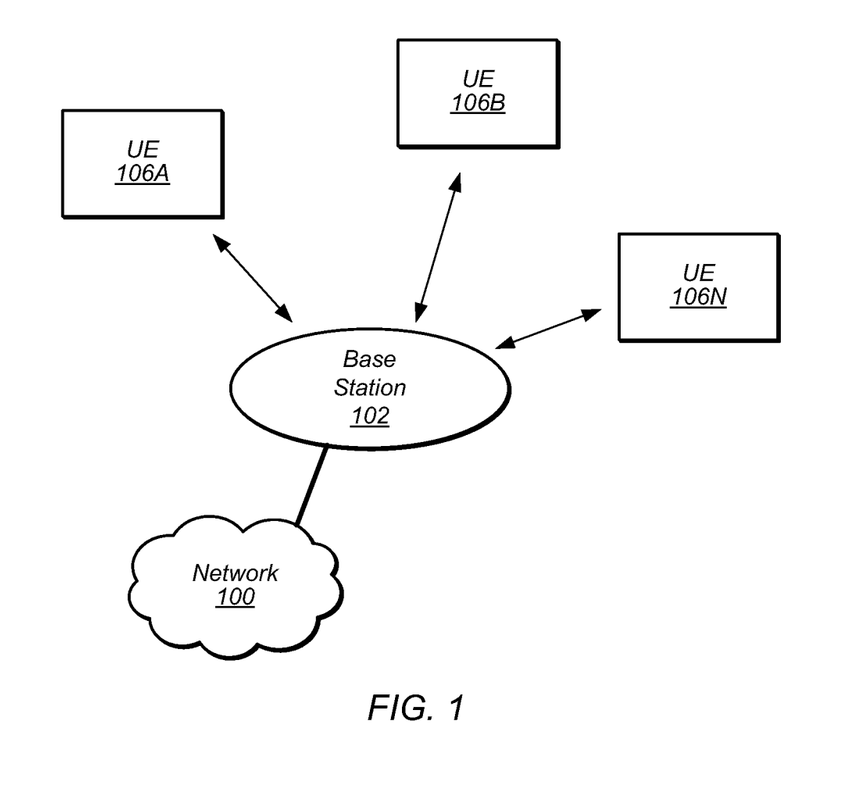
FIG. 1 illustrates an exemplary (and simplified) wireless communication system.
Figure 2:
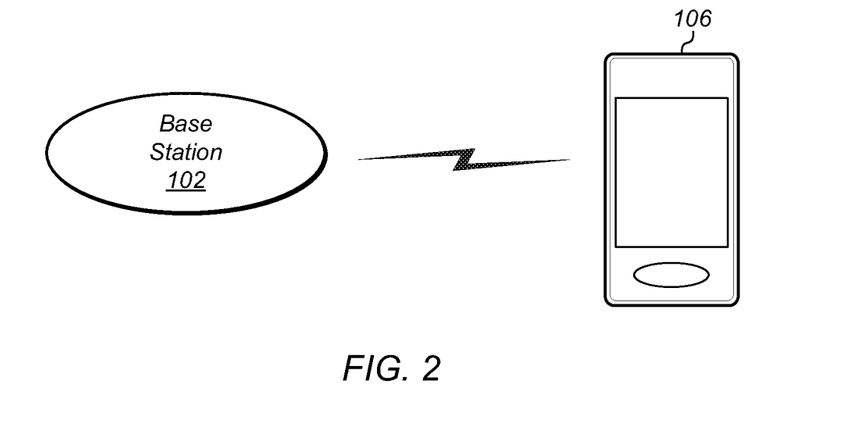
FIG. 2 illustrates an exemplary base station (BS) in communication with an exemplary wireless user equipment (UE) device.

FIGS. 1 and 2—Communication System

FIG. 1 illustrates an exemplary (and simplified) wireless communication system. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. If the base station 102 is implemented in the context of LTE, it may alternately be referred to as an 'eNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The communication area (or coverage area) of the base station may be referred to as a "cell." The base station 102 and the UEs 106 may be configured to communicate over the transmission medium using any of various radio access technologies (RATs), wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple RATs. For example, the UE 106 may be configured to communicate using two or more of GSM, UMTS, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
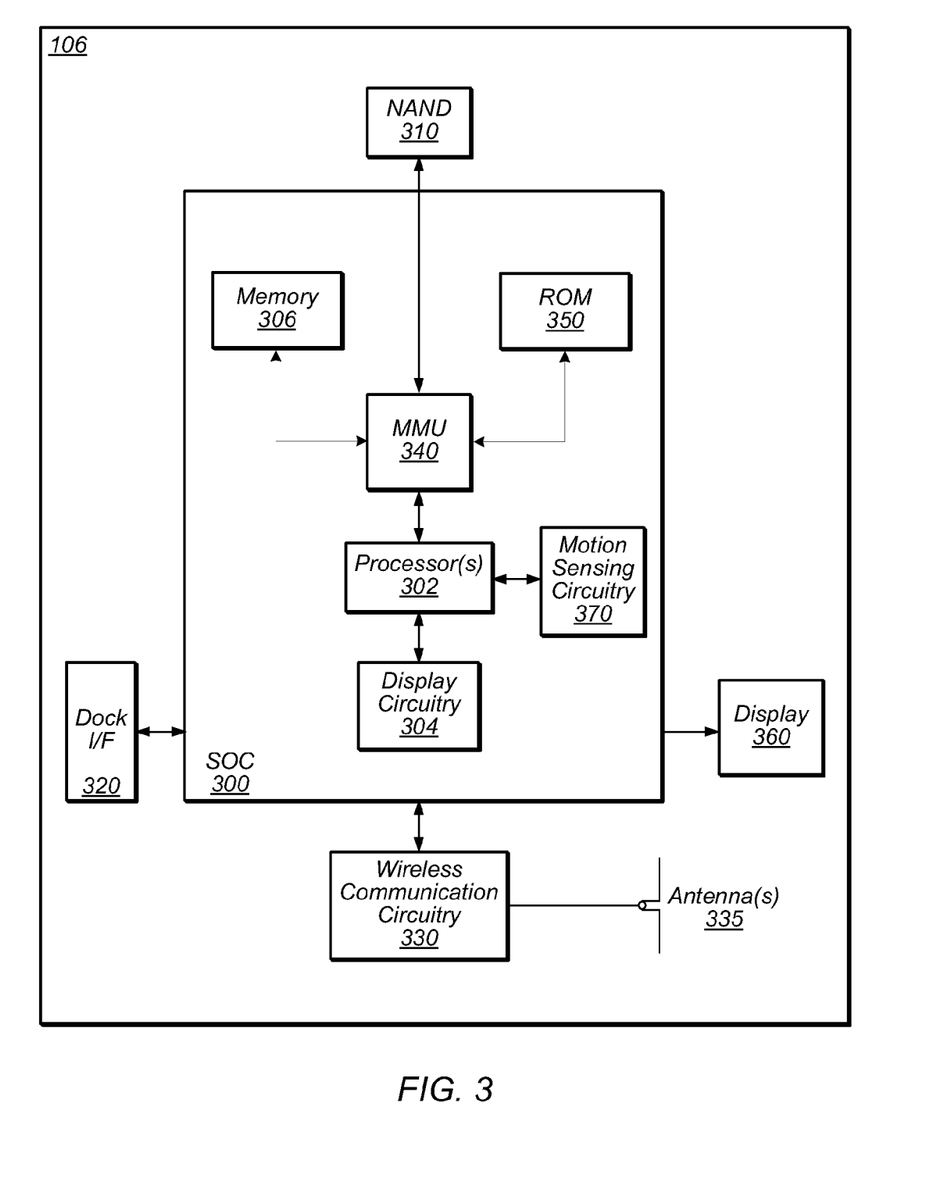
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE 106 may be configured to communicate wirelessly using multiple wireless communication standards in some embodiments.

As described further subsequently herein, the UE 106 may include hardware and software components for implementing features for throttling attempts to transition to connected mode based on device motion, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
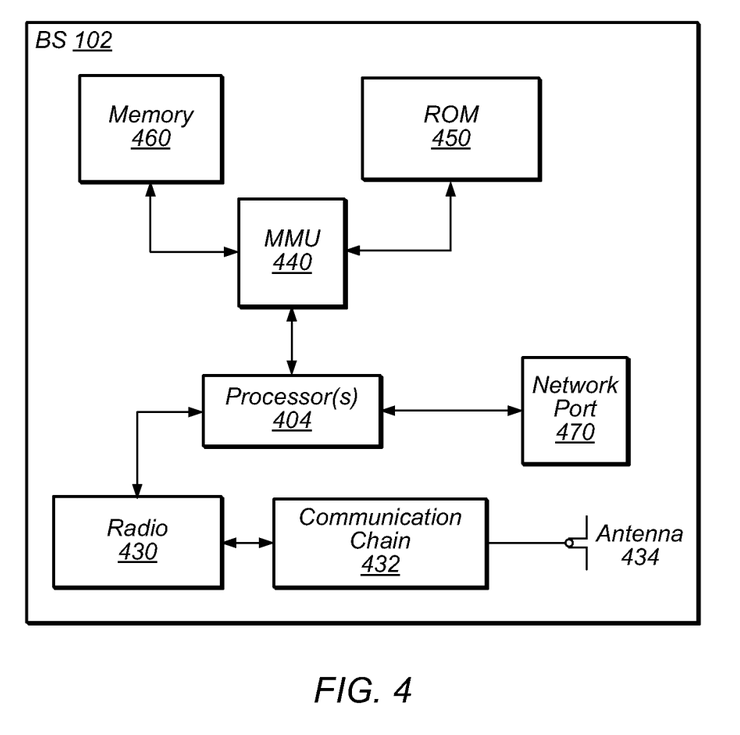
FIG. 4 illustrates an exemplary block diagram of a BS.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
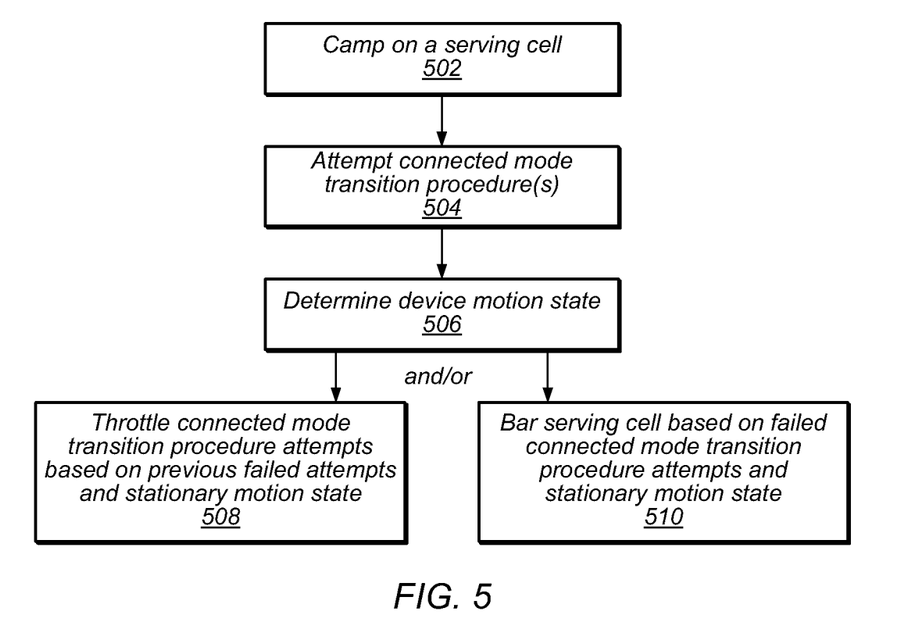
FIG. 5 is a flowchart diagram illustrating an exemplary method for a UE to enable or disable connected mode transition procedure throttling based at least in part on device motion.

FIG. 5—Flowchart

FIG. 5 is a flowchart diagram illustrating a method for a UE device 106 to enable and disable connected-mode transition procedure (e.g., RACH) throttling based at least partially on device motion. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, the UE may camp on a ("first") serving cell. The UE may utilize any of various wireless communication technologies to camp on the serving cell. For example, the serving cell may operate according to any of GSM, UMTS, LTE, CDMA2000 (1×RTT, HRPD), etc. The cell may accordingly be provided by a base station 102 and may provide a connection to a core network, e.g., of a cellular service provider. The base station 102 may operate in conjunction with numerous other base stations (which may provide other cells) and other network hardware and software to provide continuous (or nearly continuous) overlapping wireless service over a wide geographic area.

In addition to the serving cell, there may also be one or more "neighboring" cells, provided by nearby base stations, within communication range of the UE 106. The UE 106 may be capable of discovering, detecting signals from, and possibly communicating with such neighbor cells, but may not have an active wireless link with them.

The UE 106 may camp on the first cell in an idle mode. The idle mode may be used when the UE 106 is not actively exchanging data (e.g., as part of a call or a networking application such as a web browser) with the network. In a 3GPP context, the idle mode may be a radio resource control idle mode or RRC idle mode (e.g., in contrast to an RRC connected mode or state). 3GPP2 and/or other contexts are also possible. As part of the idle mode, the UE 106 may utilize a "discontinuous reception" or "DRX" technique. In DRX, a UE 106 may generally be inactive (e.g., with one or more components, such as radio and/or baseband components, powered down or sleeping) except for a (often relatively short) temporal window of activity during each DRX cycle. The active portion of a DRX cycle may be scheduled in a regular periodic manner; for example, many networks schedule the active portion of DRX cycles to occur at 1.28 s intervals, or at some multiple of 1.28 s (e.g., 2.56 s, 5.12 s, etc). Other values for DRX periodicity (e.g., 0.32 s, 0.64 s, etc.) may be used as desired.

During the active portion of a DRX cycle, the UE 106 may perform certain actions according to the configuration of the UE 106 and/or according to the configuration information received from the network. For example, the UE 106 may monitor a paging channel for incoming voice calls or data during the active portion of the DRX cycle. Information indicating the length and/or other characteristics of the DRX cycle may be provided by the network to the UE 106 as part of configuration information, in order to facilitate coordinated operation between the UE 106 and the network. Cell searches and measurements may also be performed in the active portion of at least some DRX cycles.

In 504, the UE 106 may attempt to transition the UE 106 from the idle mode to a connected mode. For example, the UE 106 may attempt a random access channel (RACH) procedure (e.g., in 3GPP contexts) or send an "OpenConnection" command (e.g., in 3GPP2 contexts). Transitioning from the idle mode to the connected mode may include acquiring synchronization and/or establishing communication channels and/or radio links which provide access to more extensive network resources (e.g., data carrying channels and/or greater uplink/downlink bandwidth) to the UE 106.

The connected mode transition procedure may be initiated based on the presence of data to be transmitted (e.g., mobile originated data/signaling) at the UE 106, for example from a networking application executing at the UE 106. The procedure may be used to set initial power for any signaling or data messages (e.g., depending on path loss). Note that in some instances, a RACH procedure may also be used for connection recovery (i.e., a connected-mode RACH) in addition to or instead of for idle to connected mode transitions (i.e., an idle-mode RACH).

The procedure may include any of various steps. As one possibility, the UE 106 may initiate a RACH procedure by transmitting a physical random access channel (PRACH) preamble ("MSG1"). The network (by way of the serving cell) may respond with a random access response ("RAR" or "MSG2") acknowledging the PRACH preamble. The UE 106 may follow up with an RRC connection request ("MSG3"). The network may respond to (acknowledge with a "MSG4") the RRC connection request to complete the RACH procedure. In the case that all messages in this message sequence between the UE 106 and the network are successfully exchanged, the RACH procedure may be successful and the UE 106 may be in the connected mode. Note that other RACH procedures (e.g., involving different numbers and/or types of steps, etc.) are also possible, as are other types of procedures for transitioning from idle- to connected-mode.

It may also be possible for an attempted transition to connected mode to fail. For example, if no response is received by the UE 106 to a PRACH preamble within a specific (e.g., configurable) duration, a RACH procedure may have failed. As another possibility, if no response to a RRC connection request is received within a specific duration, the RACH procedure may likewise have failed. In such cases, the UE 106 may attempt another RACH procedure, for example by re-transmitting the PRACH preamble with an incrementally increased transmit power relative to the previous attempt. Similarly, repeated attempts to transition to connected mode may be made according to other techniques for transitioning, in some instances.

This process (e.g., successive RACH attempts with incrementally increased transmit power) may generally repeat until one or more conditions for stopping further connected mode transition attempts is met. One such condition may of course be that such a procedure is successful. Other possible conditions might include reaching a specified maximum number of PRACH attempts (e.g., in UMTS), or upon expiration of a timer (e.g., a T300 timer in LTE).

Further possible conditions for stopping or throttling further attempts relating to a motion state may also be used. The technique of repeating connected mode transition procedure attempts with incrementally increased power after an unsuccessful attempt may be reasonably likely to result in eventual success if a UE 106 is moving, since for example the movement of the UE 106 may result in changing RF conditions and a corresponding potential for improvement in serving cell strength/quality and/or re-selection to a different serving cell with better strength/quality. However, if the UE 106 is stationary and repeated failures on the serving cell of the UE 106 occur, there may be a limited likelihood that further connected mode transition procedure attempts will be successful, since for example as long as the UE 106 is stationary the likelihood of substantial change in serving cell signal strength/quality (or re-selection to a different serving cell) may be relatively low.

Accordingly, in order to support motion state based connected mode transition throttling techniques (among various other possible reasons), in 506, a motion state of the UE 106 may be determined. The state of motion of the UE 106 may be either 'stationary' or 'non-stationary', as two possibilities. For example, if motion above a motion threshold is detected, the UE 106 may be determined to be non-stationary, while if motion detected is below the motion threshold, the UE 106 may be determined to be non-stationary. Other (e.g., intermediate) states of motion may be defined if desired.

The motion detection may be performed by motion sensing circuitry of the UE 106. For example, the UE 106 may include one or more accelerometers, gyroscopes, vibration sensors, and/or other motion sensing components, which may be capable of sensing motion magnitude and type for various types of motion.

In 508, connected mode transition throttling may be enabled if a predetermined number of (e.g., most recent) attempts have failed, and if the UE 106 is stationary. The throttling may be enabled for up to a prescribed period of time. The throttling may include preventing the UE 106 from initiating any attempts to transition to the connected mode for mobile originated data or signaling.

Alternatively, or in addition, in 510, the UE 106 may be barred from the serving cell for up to a prescribed period of time if a predetermined number of attempts to transition to connected mode have failed, and if the UE 106 is stationary. Barring the UE 106 from the serving cell may include preventing the UE 106 from camping on that cell (which may indirectly prevent or throttle further attempts to transition to connected mode on that cell). A cell may be barred by preventing camping specifically on the cell based on its cell id, or more generically by preventing camping on the frequency on which the cell is deployed, and/or by preventing attaching to the network (PLMN) to which the cell belongs, among various possibilities. Note that the requisite number of failed attempts and/or the prescribed period of time for barring a cell may be the same as or different than the requisite number of failed attempts and/or the prescribed period of time for enabling throttling of attempts to transition to connected mode, as desired.

Such motion (or lack-of-motion) based connected mode transition throttling and/or cell barring may also be contingent on one or more other conditions, if desired. As one possible example, one or more user activity indicators may be monitored. For example, a display status may be an indicator of user activity: if the display is on, this may be an indication of a higher user activity level (e.g., one or more foreground apps may be running), while if the display is off (or on because of a notification rather than user activity), this may be an indication of a lower user activity level. In some instances, such throttling and/or cell barring may not be enabled even if the UE 106 is stationary and the required threshold number of most recent attempts to transition to connected mode have failed to do so, if user activity indicators are in a state indicative of high user activity. Said another way, throttling further connected mode transition attempts for up to the prescribed period of time may also be contingent upon one or more user activity indicators being in a state indicative of low user activity. Thus, the throttling feature may at least in some instances be considered "user context aware" or "user context sensitive", where the user context may include the state of motion of the UE 106, screen activity level, and/or any of various other aspects of user context may be considered when deciding whether to enable or disable the throttling feature.

As another possible consideration, how recently the UE 106 has performed cell selection or re-selection may be monitored. For example, the UE 106 may determine when a most recent cell selection or re-selection occurred. If the UE 106 has selected or re-selected to its current serving cell during the period of time in which the predetermined number of connected mode transition attempt failures occurred (e.g., if one or more of the failed attempts occurred on a different cell), connected mode transition throttling and/or cell barring may not (yet) be enabled. In other words, throttling further attempts to transition to connected mode or barring the serving cell may also be contingent upon no cell selections or re-selections having occurred during the connected mode transition procedure attempts being considered to fulfill the threshold number of failed connected mode transition attempts.

Once the prescribed period of time expires, the UE 106 may disable the connected mode transition throttling feature and/or unbar the cell which had been barred. In this case, the UE 106 may no longer be prevented from initiating any connected mode transition attempts and/or camping on the previously barred cell. It should be noted that, at least in some instances, the UE 106 may not necessarily immediately attempt to transition to connected mode or camp on the previously barred cell upon connected mode transition throttling being disabled or unbarring of the previously barred cell, but if any new mobile originated data/signaling is generated or re-selection to that cell otherwise occurs, UE 106 may not be prevented from proceeding.

In certain circumstances, the UE 106 may disable connected mode transition throttling and/or unbar a cell prior to expiration of the prescribed period of time. For example, if the UE 106 ceases to be stationary, connected mode transition throttling may be disabled and/or a previously barred cell may be unbarred, even if the prescribed period of time has not yet expired. As another example, if the UE re-selects to a different serving cell, connected mode transition throttling may be disabled. As a further possibility, if the serving cell signal strength and/or signal quality (e.g., RSRP/RSRQ/RSCP/EcNo/etc., depending on a RAT according to which the serving cell operates) change (e.g., improve) by at least a certain threshold, connected mode transition throttling may be disabled; similarly, if signal strength and/or signal quality of a barred cell change (e.g., improve) by at least a certain threshold, that cell may be unbarred. As a still further possibility, if user activity indicators change to a state indicative of high user activity prior to expiration of the prescribed period of time, connected mode transition throttling may be disabled and/or a previously barred cell may be unbarred prior to expiration of the prescribed period of time.

In some instances, connected mode transition throttling and/or cell barring based on device motion may progress in an increasingly aggressive loop if further time goes by after the initial prescribed period of connected mode transition throttling and/or cell barring in which the UE 106 continues to be stationary and still further connected mode transition attempt failures occur.

For example, if the UE 106 is still stationary after expiration of the initial prescribed period of time, and if another (potentially different, for example smaller) threshold number of successive connected mode transition attempts have failed on the same serving cell, connected mode transition throttling may again be enabled and/or the cell may again be barred for a further (potentially different, for example longer) prescribed period of time. As one such possibility, in the first iteration of such a loop, the requisite number of connected mode transition failures might be five, and the prescribed period of time might be two minutes. In the second iteration of such a loop, the requisite number of connected mode transition failures might be three, and the prescribed period of time might be five minutes. Further iterations may further increase in aggressiveness, or stabilize at a maximum aggressiveness level, as desired. In other words, the method may be an iterative or multi-stage process, where the number of connected mode transition failures required to trigger cell barring or connected mode transition throttling may decrease with each iteration, and the period of time for which a cell is barred or connected mode transitions are throttled may increase with each iteration. In some instances, such a multi-stage algorithm may be implemented with learning capability, such that the features of each stage may be modified in accordance with increasing knowledge and/or experience with individual user behavior with respect to a particular UE 106. Such a loop or multi-stage process may be exited once a successful connected mode transition procedure is completed, if desired.

In at least some instances, the UE 106 may also re-select to another serving cell based at least in part on barring of its previous serving cell or connected mode transition throttling being enabled. For example, since the UE 106 may previously have been camping on a cell on which camping is now barred, the UE 106 may be forced to re-select to a new cell. In some instances, the UE 106 may additionally have previously barred and/or throttled connected mode transition attempts on one or more cells within range of the UE 106. In such a case, the UE 106 may monitor or track which cells are barred and/or on which cells connected mode transition attempt throttling has been enabled, and may select a cell on which camping is not barred and/or on which throttling of connected mode transition attempts is not enabled to which to re-selects. In some instances (e.g., if the UE 106 has mobile originated data or signaling to communicate), once the UE 106 is camping on a new cell, the UE 106 may perform one or more connected mode transition attempts on the new serving cell. This may not be prevented since the attempts may not be performed on a barred cell, and/or re-selecting to a new cell may trigger disabling of the connected mode transition throttling feature.

Thus, the method of FIG. 5 may provide techniques for a UE 106 to enable and disable connected mode transition throttling and/or cell barring/unbarring based at least partially on device motion (or lack thereof). This may allow the UE 106 to realize power consumption reductions by avoiding performing further connected mode transition attempts on a cell on which further connected mode transition attempts are unlikely to be more successful, e.g., due to the stationary state of the UE 106. Such techniques may potentially also improve (or at least not substantially reduce) service quality, for example by facilitating more rapid cell re-selection to a cell on which connected mode transition attempts may be successful in at least some circumstances.

Note that the connected mode transition throttling feature and the cell barring feature described herein may be applied independently or together, as desired, and for either or both of signaling and data connected mode transition attempts. Additionally, it may be the case that either or both of these features may be used in conjunction with any or all of various RATs, including but not limited to GSM, UMTS (WCDMA, TDS-CDMA), CDMA2000 (1×RTT, 1×EV-DO, HRPD, eHRPD), LTE, etc.

Note further that these features may be internally configured (e.g., as part of device design/operating algorithm(s)) or configured by the network to which the UE 106 is attached. Furthermore, any of the various thresholds and parameters (e.g., requisite number(s) of connected mode transition failures to enable connected mode transition throttling and/or cell barring, prescribed period(s) of time for such connected mode transition throttling and/or cell barring, etc.) described herein may likewise be either internally configured or provided by the network (e.g., as configuration parameter values), among various possibilities. If configured or provided by the network, any of various means of configuring such features and/or parameters may be used; for example, such information may be provided in one or more information elements in one or more configuration messages (e.g., RRC configuration messages), broadcast in one or more system information blocks (SIBs), and/or provided in any of various other ways, as desired.

Figure 6:
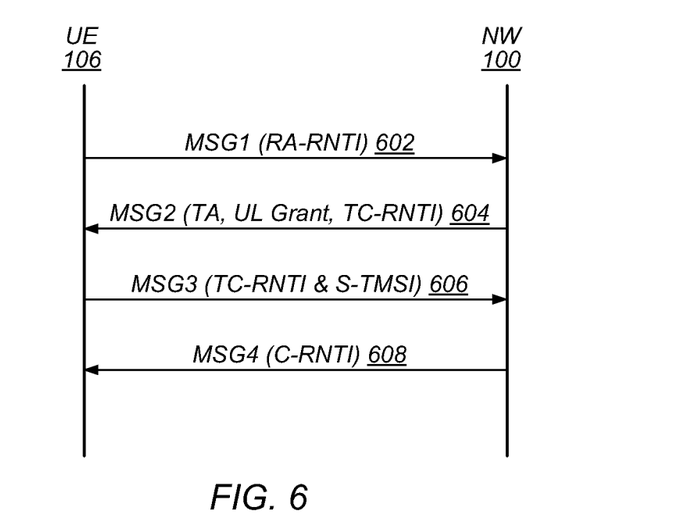
FIG. 6 is a signal flow diagram illustrating an exemplary RACH procedure.

FIG. 6—Exemplary RACH Procedure

FIG. 6 is a signal flow diagram illustrating an exemplary idle-mode RACH procedure such as might be performed between a UE 106 and a network 100 according to LTE. It should be noted while the exemplary details illustrated in and described with respect to FIG. 6 may be representative of one possible connected mode transition procedure technique, other techniques for transitioning from idle to connected mode (e.g., according to other RATs) are also possible. Accordingly, the features of FIG. 6 are not intended to be limiting to the disclosure as a whole: numerous variations and alternatives to the details provided herein below are possible and should be considered within the scope of the disclosure.

A RACH may be a contention-based procedure for acquiring synchronization and establishing communication channels and/or radio links which provide access to more extensive network resources (e.g., data carrying channels and/or greater uplink/downlink bandwidth)

As shown, in 602 the UE 106 may transmit a first message to the network 100. The first message ("Msg1") may include a RACH preamble, including a random access radio network temporary identifier (RA-RNTI).

In 604, the UE 106 may receive a second message from the network 100. The second message ("Msg2", also referred to as "random access response" or "RAR") may include a timing advance (TA) parameter, a temporary cell radio network temporary identifier (TC-RNTI), and an uplink grant for transmitting a third message.

In 606, the UE 106 may transmit the third message to the network 100. The third message ("Msg3", also referred to as "RRC connection request") may include the TC-RNTI and a system architecture evolution temporary mobile subscriber identity (S-TMSI) to identify the UE 106 to the network 100.

In 608, the UE 106 may receive a fourth message from the network 100. The fourth message ("Msg4" or "contention resolution message") may promote the TC-RNTI to a cell radio network temporary identifier (C-RNTI). The C-RNTI may be used for subsequent connected-mode RACH attempts, among various uses, as desired.

Upon completion of the four message sequence, the UE 106 may be in a connected mode (e.g., RRC_connected) with the network 100, and may perform network data exchange via its serving cell.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processing element configured to:
perform a plurality of successive attempts to transition to a connected mode via a first cell;
determine that the apparatus is stationary;
determine that a first threshold number of successive connected mode transition attempts on the first cell have failed while the apparatus is stationary;
bar camping on the first cell for up to a first predetermined period of time based on determining that the first threshold number of successive connected mode transition attempts have failed while the apparatus is stationary.

2. The apparatus of claim 1,
wherein each successive connected mode transition attempt is performed based on failure of the previous connected mode transition attempt, wherein each successive connected mode transition attempt comprises transmitting with an incrementally increased transmit power relative to the previous connected mode transition attempt.

3. The apparatus of claim 1, wherein the processing element is further configured to:
unbar camping on the first cell upon expiration of the first predetermined period of time.

4. The apparatus of claim 1, wherein the processing element is further configured to:
determine that the apparatus is no longer stationary prior to expiration of the first predetermined period of time;
unbar camping on the first cell prior to expiration of the first predetermined period of time based on determining that the apparatus is no longer stationary prior to expiration of the first predetermined period of time.

5. The apparatus of claim 1, wherein the processing element is further configured to:
determine that the apparatus has a low user activity level based on one or more user activity indicators,
wherein barring camping on the first cell for up to the first predetermined period of time is also based on the apparatus having a low user activity level.

6. The apparatus of claim 5, wherein the one or more user activity indicators comprise an on/off status of a display comprised in or coupled to the apparatus.

7. The apparatus of claim 5, wherein the processing element is further configured to:
determine that the apparatus no longer has a low user activity level prior to expiration of the first predetermined period of time;
unbar camping on the first cell prior to expiration of the first predetermined period of time based on determining that the apparatus no longer has a low user activity level prior to expiration of the first predetermined period of time.

8. The apparatus of claim 1, wherein the processing element is further configured to:
re-select to a second cell in response to barring camping on the first cell, wherein camping is not barred on the second cell; and
perform at least one connected mode transition attempt on the second cell.

9. The apparatus of claim 1, wherein the processing element is further configured to:
perform at least one additional iteration of barring camping on the first cell,
wherein each successive iteration of barring camping on the first cell is performed if the apparatus is still stationary and if a respective threshold number of further successive connected mode transition attempts on the first cell have failed,
wherein the respective threshold number of successive further connected mode transition attempts for each successive iteration of barring camping on the first cell is less than a threshold number of successive further connected mode transition attempts for a previous iteration,
wherein camping on the first cell is barred at each successive iteration for up to a respective predetermined period of time which is greater than a predetermined period of time up to which camping on the first cell is barred for the previous iteration.

10. An integrated circuit including a processor, comprising:
camping circuitry configured to select a serving cell to camp on in an idle mode;
monitoring circuitry configured to monitor a motion state of the integrated circuit; and
transitioning circuitry configured to attempt to transition from the idle mode to a connected mode by performing one or more connected mode transition procedure attempts,
wherein the transitioning circuitry is configured to throttle connected mode transition procedure attempts for up to a first predetermined period of time if a number of previous connected mode transition procedure attempts equal to a first threshold number have failed and the integrated circuit is in a stationary motion state.

11. The integrated circuit of claim 10, further comprising:
user activity level determining circuitry configured to determine a user activity level based on one or more user activity indicators;
wherein the transitioning circuitry is configured to throttle connected mode transition procedure attempts for up to the first predetermined period of time further contingent upon determining that the user activity level is low.

12. The integrated circuit of claim 10, wherein the transitioning circuitry is further configured to:
determine whether any cell selections or re-selections have occurred during the previous connected mode transition procedure attempts; and
throttle connected mode transition attempts for up to the first predetermined period of time further contingent upon no cell selections or re-selections having occurred during the number of previous connected mode transition procedure attempts equal to the first threshold number.

13. The integrated circuit of claim 10,
wherein the transitioning circuitry is further configured to cease throttling connected mode transition procedure attempts if the first predetermined period of time expires or if the integrated circuit ceases to be stationary.

14. The integrated circuit of claim 10,
wherein the transitioning circuitry is further configured to cease throttling connected mode transition procedure attempts if the integrated circuit re-selects to a different cell on which connected mode transition procedure attempts are not currently throttled.

15. The integrated circuit of claim 10,
wherein the transitioning circuitry is further configured to temporarily bar camping on a first cell if a number of previous connected mode transition procedure attempts on the first cell equal to the first threshold number have failed and the integrated circuit is in a stationary motion state.

16. A wireless user equipment (UE) device, comprising:
an antenna;
a radio operably coupled to the antenna;
a processing element operably coupled to the radio; and
wherein the UE device is configured to:
　establish an idle mode cellular link with a cellular network via a first cell;
　attempt to transition to a connected mode cellular link with the cellular network via the first cell;
　determine whether the UE device is stationary;
　temporarily cease attempting to transition to a connected mode cellular link with the cellular network via the first cell if the UE device is stationary and the attempting to transition to a connected mode cellular link with the cellular network via the first cell meets a failure threshold level.

17. The UE device of claim 16,
wherein to temporarily cease attempting to transition to a connected mode cellular link with the cellular network via the first cell, the UE device is configured to bar camping on the first cell for up to a predetermined period of time.

18. The UE device of claim 16,
wherein to temporarily cease attempting to transition to a connected mode cellular link with the cellular network via the first cell, the UE device is configured to throttle connected mode transition procedure attempts via the first cell for up to a predetermined period of time.

19. The UE device of claim 16, wherein the UE device is further configured to:
resume attempting to transition to a connected mode cellular link with the cellular network via the first cell if the UE device is no longer stationary or if a timer associated with temporarily ceasing attempting to transition to a connected mode cellular link with the cellular network via the first cell expires.

20. The UE device of claim 16, wherein the UE device is further configured to:
re-select to a second cell based at least in part on the UE device being stationary and the attempting to transition to a connected mode cellular link with the cellular network via the first cell meeting the failure threshold level.

* * * * *